United States Patent [19]

Cremer et al.

[11] 4,304,384

[45] Dec. 8, 1981

[54] DEVICE FOR ADJUSTING INCLINED POSITION OF SEATS, PARTICULARLY MOTOR VEHICLE SEATS

[75] Inventors: Heinz P. Cremer; Willibald Strowik, both of Remscheid, Fed. Rep. of Germany

[73] Assignee: Keiper Automobiltechnik GmbH & Co. KG, Remscheid, Fed. Rep. of Germany

[21] Appl. No.: 84,796

[22] Filed: Oct. 15, 1979

Related U.S. Application Data

[63] Continuation-in-part of Ser. No. 78,201, Sep. 24, 1979, abandoned.

[30] Foreign Application Priority Data

Sep. 23, 1978 [DE] Fed. Rep. of Germany ....... 2841511
Jun. 30, 1979 [DE] Fed. Rep. of Germany ....... 2926450

[51] Int. Cl.$^3$ .............................................. B60N 1/08
[52] U.S. Cl. .................................. 248/397; 248/424; 297/313
[58] Field of Search ............... 297/325, 329, 313, 320, 297/326, DIG. 7, 327, 328, 318; 248/397, 424, 372.1, 393, 394, 395, 396, 325, 329

[56] References Cited

U.S. PATENT DOCUMENTS

| | | | |
|---|---|---|---|
| 2,240,143 | 4/1941 | Lustig | 248/395 X |
| 2,367,829 | 1/1945 | Shinn | 297/313 |
| 3,695,570 | 10/1972 | Ishida | 248/397 |
| 4,067,533 | 1/1978 | Kazoka et al. | 297/328 |
| 4,074,886 | 2/1978 | Yates | 248/394 |

FOREIGN PATENT DOCUMENTS

| | | | |
|---|---|---|---|
| 2051958 | 8/1979 | Fed. Rep. of Germany | 248/397 |
| 554929 | 7/1943 | United Kingdom | 297/328 |
| 1166826 | 10/1969 | United Kingdom | 297/328 |

*Primary Examiner*—James T. McCall
*Attorney, Agent, or Firm*—Michael J. Striker

[57] ABSTRACT

The inclination adjuster for motor vehicle seats having a seat carrier extending at lateral sides of the seat and being pivotable at its rear end about a pivot axle supported for rotation on a guiding track assembly, includes gear segments secured to the lateral sides of the track assembly; a transverse axle supported in horizontal guiding slots in the side walls of the seat carrier and each supporting for rotation a gear pinion; a holding bracket having a vertical cutout defining superposed recesses for receiving the shaft in a selected vertical position of the seat and a free vertical passage; and a hand-operated and spring-biased arresting linkage normally urging the transverse shaft into the selected recess and permitting the movement of the shaft in the guiding slot to adjust the vertical position of the seat when actuated.

13 Claims, 8 Drawing Figures

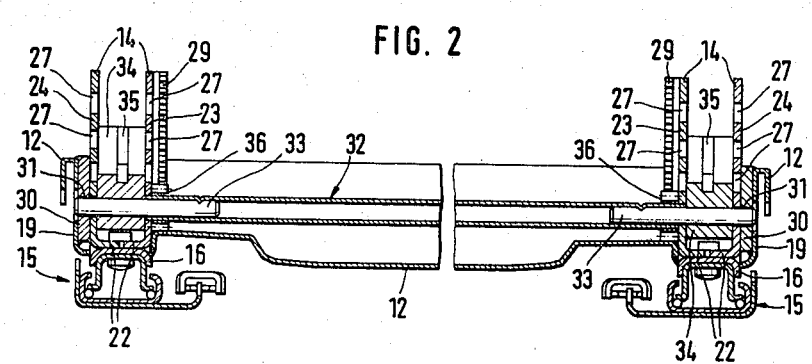
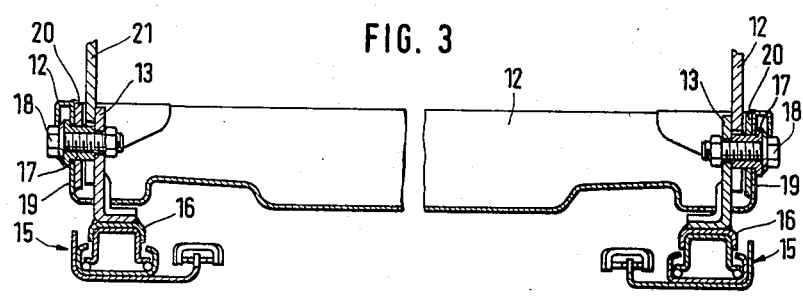
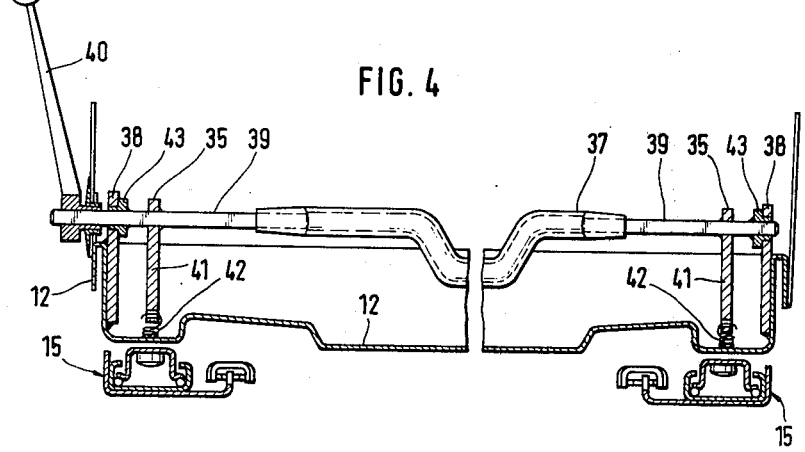

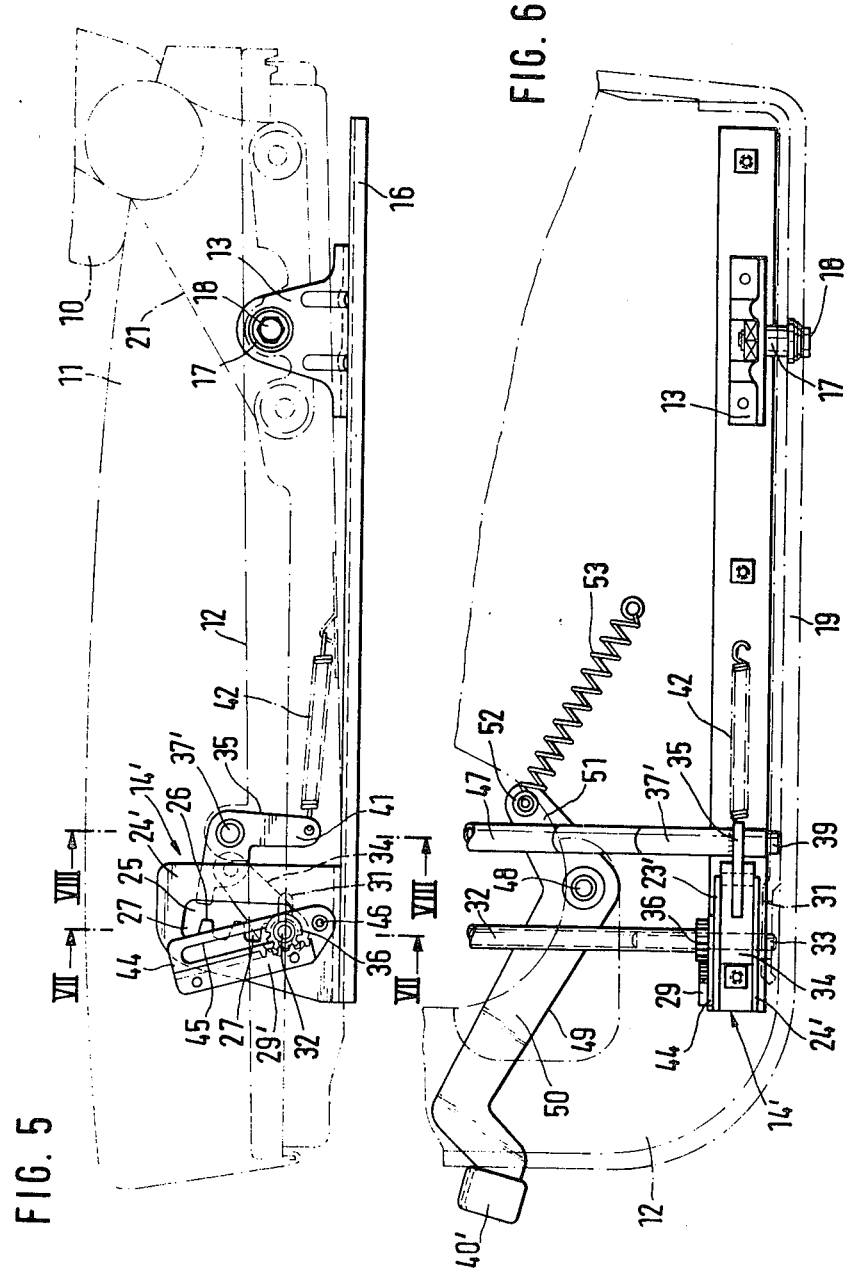

DEVICE FOR ADJUSTING INCLINED POSITION OF SEATS, PARTICULARLY MOTOR VEHICLE SEATS

CROSS-REFERENCE TO RELATED APPLICATION

This application is a continuation-in-part application of my co-pending application Ser. No. 078,201, filed Sept. 24, 1979 abandoned, and entitled *INCLINATION ADJUSTING DEVICE FOR SEATS, AUTOMOTIVE VEHICLE SEATS IN PARTICULAR.*

BACKGROUND OF THE INVENTION

This invention relates generally to position adjusters for seats, particularly motor vehicle seats of the type having a seat carrier secured to the upper sides of the seat proper and being pivotably supported at its rear part on a guiding track assembly secured to the floor of the vehicle; the front portion of the seat carrier is vertically adjustable by means of a guiding device including at each lateral side of the seat a pinion engaging a gear segment extending in vertical direction from the guiding track assembly whereby the front part of the seat is arrestable in predetermined vertical positions by a controllable arresting device.

In a known seat adjuster of the aforedescribed type there are provided angular pieces arranged at both sides of the seat and secured to the rear part of the seat carrier. The vertical arm of each angular piece is formed with oblong slots or recesses arranged one above the other and each extending in the horizontal direction. The vertical arms of the angular pieces rest, respectively, on an angular plate rigidly connected to corresponding runway rails of the guiding track assembly. The angular plate has two bores one of which can be selectively brought into alignment with one of the oblong slots in the vertical arm of the angular piece of the seat carrier. The other bore of the angular plate is coupled to an actuation rod having a bent pin adapted for passing both the oblong slot and the bore aligned with the latter and in the locking position, the seat can be tilted up and down about the pivot point formed in the oblong slot. In the front region of the seat carrier at both lateral sides of the seat is mounted a plate having an opening extending also in the vertical direction and being provided at one side with teeth. Another plate secured to the runway rail of the guiding track assembly extends parallel to the first mentioned plate and supports for rotation a pinion which engages the teeth of the first plate. The pinions at opposite lateral sides of the seat are arranged respectively on a splined pin and are connected for joint rotation with a shaft so that rotary movement from one pinion is transmitted to the other pinion. A bevel gear is rigidly connected to a plate supporting the pinion at one of the lateral sides of the seat. Another bevel gear is supported for joint rotation with the corresponding splined pin of the shaft interconnecting the pinions and is axially displaceable via a handle to engage the firstmentioned bevel gear on the plate. In this manner the pinion engaging the toothing in the opening of the plate connected to the seat carrier is arrested by the meshing bevel gears and the front part of the seat carrier can be vertically adjusted whereas its rear part is maintained at the level of its pivot point. The vertical adjustability of the front region of the seat takes place in steps corresponding to the tooth pitch of the bevel gears. Inasmuch as the vertical adjustment by means of oblong slots in the angular piece on the rear part of the seat carrier is also possible, the toothing of both front plates cannot extend along an arc since the arcuate shape can be related to one pivot point only and consequently the stepwise adjustment of other pivot points at the rear part could not take place. For this reason it is necessary to provide the oblong slots in the angular pieces in the rear portion of the seat carrier and the toothing in the plates in the front region of the seat carrier such as to extend along straight vertical lines. In a fixed position of the seat, however, this arrangement brings about a horizontal movability of the seat in the holding slots and this horizontal movement is unavoidable because of the play between the teeth of the bevel gears and between the vertical toothing in the plates and the meshing pinions. Such a horizontal movability of the seat is disadvantageous because during acceleration and braking deceleration of the vehicle the user of the seat experiences feelings of uncertainty and in addition the seat generates noises.

SUMMARY OF THE INVENTION

It is therefore a general object of the present invention to overcome the aforementioned disadvantages.

More particularly, it is an object of the invention to provide an improved seat adjuster which permits a synchronized adjustment at both lateral sides of the seat and a secure adjustment of the inclined position of the seat without any backlash.

In keeping with these objects and others which will become apparent hereafter, one feature of the invention resides in an inclination adjuster of the aforedescribed type which preferably has a single pivot point at the rear side of the seat carrier, in a combination which comprises at the front side of the seat carrier a transverse shaft passing through the lateral faces of the seat carrier and being supported therein for a limited horizontal displacement, and arresting bracket projecting from the runway rail of the guiding track assembly and being formed with a cutout defining at one side a vertical guiding track for the transverse shaft and at the opposite side a plurality of superimposed recesses adapted for receiving the end portions of the transverse shaft, and means for arresting the shaft in the selected recess. One side of the vertical guiding track in the cutout of each bracket is preferably formed with teeth constituting the gear segment and each end portion of the transverse shaft supports for rotation a pinion which is engageable with the vertical toothing. This rack-and-pinion vertical guiding arrangement at each side of the seat enables a very economic construction of the inclination adjusters for the seat carrier inasmuch as it does not present any excessive requirements to the torsional rigidity of the seat carrier and therefore thin walled cup-shaped seat carriers can be employed. In addition, the employment of superimposed locking recesses in the vertical brackets for arresting the transverse shaft in different vertical positions makes it possible to arrest the seat without any play with respect to the supporting guiding track assembly or to the vehicle floor.

In one embodiment of this invention, a flawless and easy motion of the pinions of the vertical toothing on the one hand and a secure locking of the transverse shaft which supports the pinions on the other hand, is attained by the provision of an arcuate vertical guiding track the center of curvature of which is the rear pivot point of the seat carrier and by arranging a correspondingly curved gear segment in an operative proximity to the assigned side of the guiding track so that the pinion may, in one end position of the transverse shaft in the horizontal guiding slot, engage the gear segment whereas in the opposite end position the shaft enters one of the oblong recesses. The arresting mechanism is constituted of a linkage hinged to the lateral face of the seat carrier and coupled at one end to the shaft whereas to the other end is subject to a bias of a spring which resiliently forces the shaft into engagement with the selected oblong slot. A handle coupled to the linkage displaces the transverse shaft from the slot and brings the pinion into engagement with the gear segment. Preferably, the gear segment and the vertical guiding track are arranged on the side of the cutout which is closer to the rear pivot point and the opposite side of the cutout having the superimposed recesses is near the front edge of the seart carrier. In order to eliminate any play of the transverse axle in the recess of the bracket in the selected inclined position of the seat, the oblong recesses have a tapering shape converging proportionally with the increasing depth. It is of course sufficient when only one of the recessed sides be inclined relative to the opposite side so that the shaft when entering the recess comes into a tight engagement with the latter without any play at all. According to another feature of this invention, the arresting mechanism which keeps the shaft in a positive engagement with the selected holding recess includes an elbow lever which at its apex is hinged to the seat carrier and having its free end connected to a tension spring which biases the whole arresting linkage and thus the transverse shaft in the arresting direction.

According to still another feature of this invention a compact and space saving structural unit is attained when the arresting bracket is formed of two angular pieces rigidly connected to the guiding track assembly and forming together a U-shaped bracket the arms of which enclose the link of the arresting linkage which is coupled between the shaft and the elbow lever. The inner arm of the U-shaped bracket is firmly connected to the aforementioned gear segment.

Whereas in the aforedescribed embodiment of the arresting linkage the vertical position of the front part of the seat is adjustable by shifting the center of gravity of the user of the seat, the release or the locking of the arresting device takes place by actuating a hand lever which preferably is connected for joint rotation with a pivot axle which is fixedly connected to the elbow lever of the arresting linkage.

A noise-free transfer of acceleration and deceleration forces between the seat and the guiding track assembly for the floor of the vehicle is achieved with advantage by forming the rear pivot point of the seat carrier as collar bushing screwed into the bearing bracket projecting from the rear of the guiding track assembly and the rear part of the seat carrier is pivotably supported in this bushing.

In another embodiment of this invention, the front holding brackets support respectively, for a pivotal movement a rocking arm formed with a vertical slot for guiding the end parts of the transverse shaft and supporting at one side the gear segment preferably in the form of a straight rack which permanently engages the pinion on the shaft. In this manner, the arresting device is not subject to any load from the user of the seat and operates more reliably and without any disturbances. The pinion and the gear segment are continuously in mesh with one another and consequently they are always ready for the guiding function without any engaging and disengaging movements. Even in the case of an excessive and unsymmetrical load on the seat carrier, this arrangement prevents the lowering of one end of the shaft relative to the other end due to the continuous engagement of the pinion in the assigned gear segment, an absolutely synchronous movement of the ends of the shaft is guaranteed. Preferably, each gear segment is rigidly connected to its rocking arm and the vertical slot in the latter enables the permanent engagement of the pinion and the segment. With advantage, the rocking arms are hinged to the assinged arresting brackets below the cutout.

As mentioned above, the application of the rocking arms makes it possible to shape the gear segment in the form of a straight rack and also the vertical guiding slot in the rocking arm has a rectilinear configuration extending over the range of the rolling movement of the pinion.

In still another modification of this invention, the elbow levers in both arresting linkages are interconnected by a pivot axle which has a crank-shaped intermediate portion which cooperates with a roller of an actuation lever which is pivotably supported for movement in a plane perpendicular to the plane of rotation of the crank-shaped portion of the pivot axle. The adjustment lever is hinged to the seat carrier and is biased by a spring into a relesing position.

The novel features which are considered as characteristic for this invention are set forth in particular in the appended claims. The invention itself, however, both as to its construction and its method of operation, together with additional objects and advantages thereof, will be best understood from the followng description of the specific embodiments when read in connection with the accompanying drawing.

BRIEF DESCRIPTION OF THE DRAWING

FIG. 2 is a sectional view of the inclination adjuster of FIG. 1 taken along the line II—II;

FIG. 3 is a sectional view of the rear pivotable support of the seat of FIG. 1 taken along the line III—III;

FIG. 4 is a sectional view of the pivot axle for actuating the arresting mechanism of the adjuster of FIG. 1, taken along the line IV—IV;

FIG. 5 is a side view of a modification of an inclination adjuster for a motor vehicle seat of this invention;

FIG. 6 is a cut-away top view of one lateral side of the vehicle seat of FIG. 5;

DESCRIPTION OF THE PREFERRED EMBODIMENTS

Figure 1:
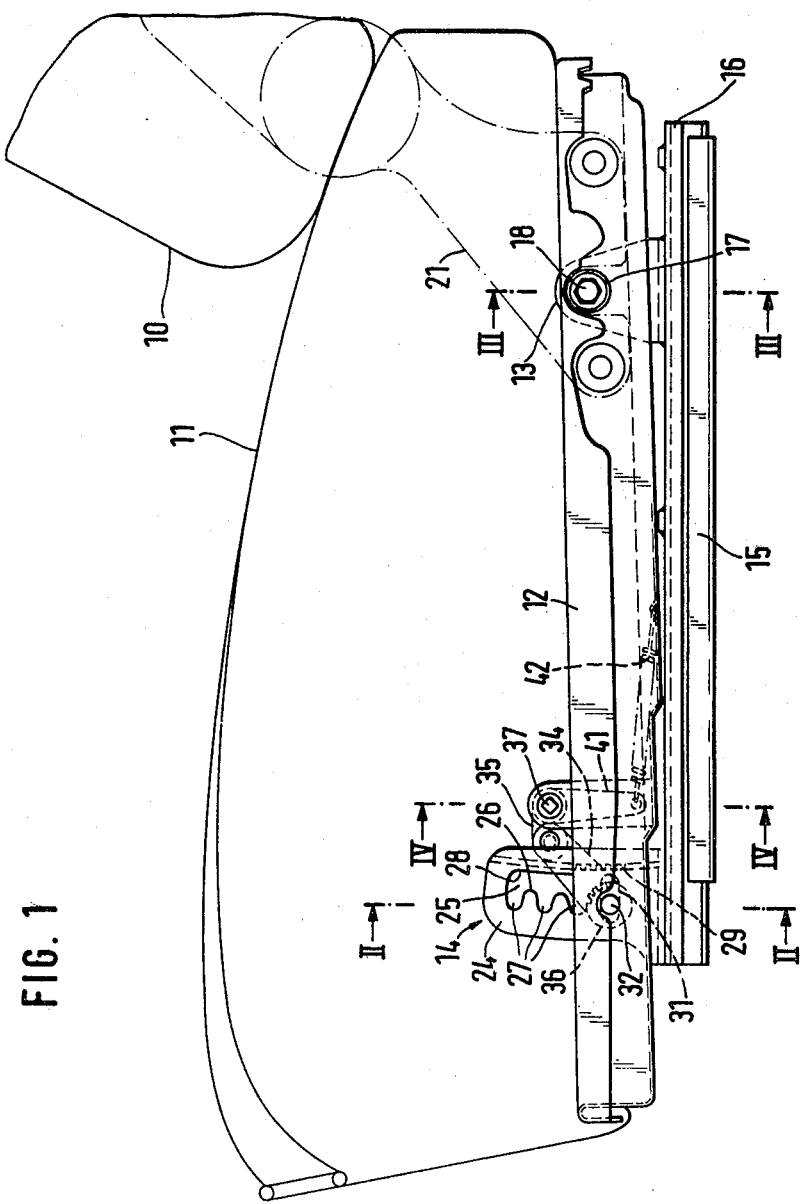
FIG. 1 is a side view of one embodiment of the inclination adjuster of this invention mounted on a seat carrier which is supported on a guiding track assembly.

The inclination adjuster of this invention is applied to a motor vehicle seat including a backrest 10 and a seat proper 11. The seat part 11 is mounted on a seat carrier 12 which in the illustrated embodiments has a cup-shaped configuration. The rear ends of the lateral sides of the seat carrier 12 are pivotably supported on bearing brackets 13 and the front portion of the carrier is supported on a position arresting brackets 14 forming the part of the inclination adjuster which will be explained below. Both pairs of brackets 13 and 14 are supported on a guiding track assembly 15.

The bearing brackets 13 project from runway rails 16 on the guiding track assembly 15 on both lateral sides of the seat and each is provided at its top with a collar bushing 17 which is held in position by bolt 18. The bushings 17 are aligned with each other and serve as hinge joints for supporting the rear part of the seat carrier 12 (FIG. 3). Since the seat carrier 12 is made of a thin walled metal sheet stamped into a cup-like shape, the thin walls 19 of the carrier 12 are reinforced by bearing lugs 20 which are supported for rotation on respective bushings 17. The rear end of each lateral side of the seat carrier 12 is also coupled to a hinge member 21 which forms a part of a hinge mount reclinably coupling the seat element 11 to the brackrest 10 of the seat.

The front end of each lateral side of the seat carrier as mentioned above, is arrestably supported on a holding bracket 14 which projects also from the runway rail 16 of the guiding track assembly 15. Each bracket 14 is assembled of two angular pieces 22 secured to the lower runway rail 16 in such a manner as to form two supporting arms 23 and 24 arranged in a spaced relationship and parallel to one another. Each of these supporting arms 23 and 24 is formed with a vertically extending cutout 25 which in this embodiment is curved about the rear pivot point. The front edge or side in the cutout 25 is shaped with a plurality of uniformly spaced tapering recesses 27 arranged one above the other. The inner walls of each recess extend at a sloping angle one to another so that the clearance decreases with increasing depth. The arcuate vertical guiding wall 28 of the inner arm 23 of each bracket 14 is connected to a gear segment 29 having the same curvature as the cutout 25. The lateral faces 19 of the seat carrier 12 are formed in the range of the cutout 25 with a horizontally directed guiding slot 31 which supports the end portion of shaft 32 so that the latter is movable in a substantially horizontal direction in the range of the cutout 25. As seen more clearly in FIG. 2, the shaft 32 is assembled of an intermediate tubular piece and of two end pins 33 projecting through the cutouts in the arms 23 and 24 of the bracket 14. Each end pin 33 of the transverse shaft 45 pivotably supports in the range between the bracket arms 23 and 24 a coupling link 34 which at its free end is a hinged to an elbow lever 35 to form therewith an arresting mechanism as it will be explained below. In addition, the end pins of shaft 32 support for free rotation gear pinions 36 which engage the facing gear segment 29 when the shaft 32 is moved to the rear end of the guiding slots 31. In this retracted position the end pins 33 of the shaft 32 can pass without obstruction in either vertical direction in the cutout 25 while both pinions 36 are in engagement with the assigned gear segments 29. To achieve this retracted position of the shaft 32, the arresting linkage formed by the coupling link 34 and the elbow lever 35 is actuated by rotating a pivot axle 37 which is fixedly connected to the apex of the elbow lever 35 and supported for rotation in bearing bushings 38 arranged in respective lateral walls 19 of the seat carrier 12. As illustrated in FIG. 4, the pivot axle 37 for the arresting linkage includes an intermediate connecting tube 37 shaped into a crank-like configuration and being firmly connected at each end thereof to rods 39 of a rectangular cross-section. These rods 39 support for joint rotation the elbow levers 35 and at their ends are firmly connected to sleeve inserts 43 which are supported for rotation in bearing bushings 38 in the walls of the seat carrier 12. In addition one end of the rod 39 extends outwardly through the side wall of seat carrier 12 so that a hand lever 40 can be attached to the projecting end portion. The short arm of each elbow lever 35 is hinged to the link 34 and the long arm 41 of the lever 35 is attached to an energy storing member such as, for example, a tension spring 42 which biases the short arm of the lever downwardly. As a result, when the actuation lever 40 is in its normal or released condition the spring 42 urges the transverse axle 32 forwardly so that the latter is displaced to the other end of the horizontal slot 31 and comes into engagement with a selected holding recess 27. At the same time the pinions 37 disengage the gear segments 29.

In order to change the inclined position of the seat part 11, hand lever 40 is first lifted against the force of the tension spring 42 whereby the short lever arm of both elbow levers 35 are turned clockwise upwardly and the link arms 34 displaces shaft 32 in the oblong slots 31. In doing so, the end pins 33 of the shaft leave the holding recesses 27 in the brackets 14 and the pinions 36 are brought into engagement with the gear segments 29. While holding the hand operated control lever 40 in its actuated position the seat part 11 can be tilted upwardly or downwardly by the application of the weight of the user of the seat to corresponding points. In the desired inclined position the handle 40 is released and springs 42 retract the long arms 41 of elbow levers 35 so that the latter are operated counterclockwise about the pivot axle 37 and the links 34 displace shaft 32 in the oblong slots 31 in forward direction and the end pins 33 of the shaft enter the recesses 27 in the selected inclined position. Simultaneously the pinions 36 disengage the gear segments 29. Since the elbow levers 35, the links 34 and the shaft 32 are now under a constant resilient bias by the springs 42, the end pins 33 of shaft 22 are urged into the tight engagement with the sloping walls of the recesses 27 and are thus kept in the arresting position without any play. In this manner, any rattling noises in the arrested position of the seat are effectively avoided.

Figure 7:
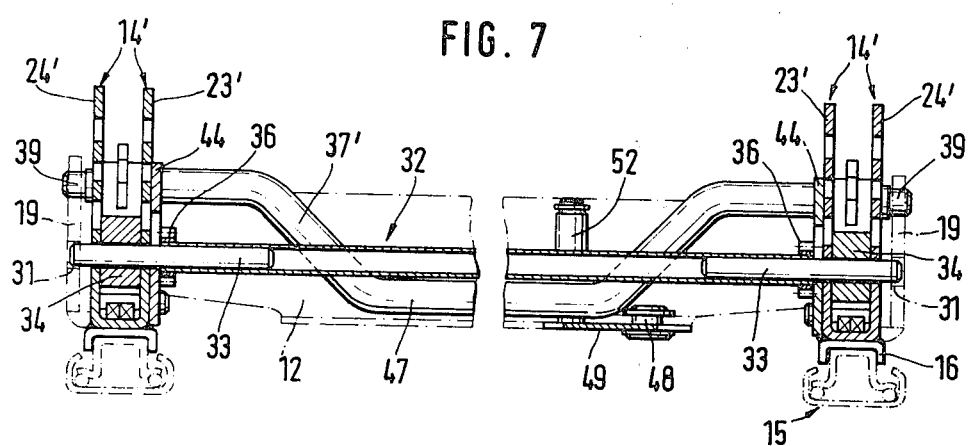
FIG. 7 is a sectional front view of the inclination adjuster of FIG. 5 taken along the line VII—VII.
Figure 8:
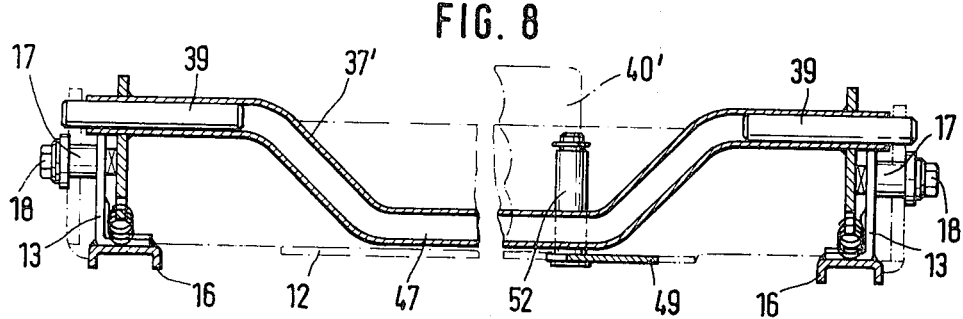
FIG. 8 is a sectional front view of the pivot axle for the arresting mechanism in the inclination adjuster of FIG. 5 taken along the line VIII—VIII.

In the embodiment of this invention as shown in FIGS. 5 through 9 there are provided rocking arms 44 pivotably connected to the inside arms 23' of each bracket 14' by means of pivot pins 46 located below the vertical cutout 25. Each rocking arm 34 has an upwardly directed guiding slot 45 extending in the range of the cutout 25 in the arresting bracket 14'. In addition, each locking arm 34 supports a gear segment 29' arranged at a vertical side of the slot 45. In the shown example the gear segment 29' is riveted to the rocking arm 44 and performs therefore, a swinging movement together with the latter. For this reason the gear segments 29' are in the form of straight racks. Similarly as in the aforedescribed example, side walls 19 of seat carrier 12 are reinforced in the range of arresting brackets 14' and are formed with approximately horizontally directed guiding slots 31 for movably supporting the end portions of the transverse shaft 32. As seen particularly from FIG. 7, the shaft 32 consists of an intermediate tubular portion the ends of which are firmly connected to end pins 33 extending through the cutouts 25 in the brackets 14'. In the area between the supporting arms 23' and 24' of the bracket 14' each end pin 33 in coupled to the link 34 which on its other end is hinged to the short arm of the elbow lever 35'. Pinions 36 are pivotably supported on the axle 32 and are in permanent engagement with the racks 29' secured to the rocking arm 44. The projecting ends of the pins 33 are guided in the vertical slot 45 of the rocking arms 44 and project also through the cutouts 25 in respective arms 23' and 24' of the bracket 14' into the guiding slots 31. The actuation linkage including the links 34 and the elbow levers 35' displaces the end pins 33' in the corresponding guiding slots 31 between an arresting position in selected recesses 27 and a setting position in which the pins are movable in the vertical slot 45 and in the vertical passage in the cutouts 25. In either position pinions 36 remain in mesh with the toothed racks 29' and consequently both lateral sides of the seat carrier 12 are synchronously displaced upwardly or downwardly. The apex of each elbow lever 35' are connected for joint rotation to a pivot axle 37' which is supported for rotation in the side wall 19 of the seat carrier 12. As seen from FIG. 8, the pivot axle 37' includes an intermediate tubular portion shaped into a crank-like configuration 47. The ends of the bent tubes are rigidly connected to rods 39' which on their free ends exceeding the intermediate tube are firmly connected to elbow levers 35' and are supported for rotation in the bearings in the side walls 19 of the seat carrier.

The actuation of the arresting mechanism in this embodiment takes place via a handle 40' attached to a longer arm 50 of an actuation elbow lever 49 the apex of which is rotatable about a fixed pivot axle 48 mounted on the bottom of the cup-shaped seat carrier 12. The handle 40' projects below the front edge of the seat and the lower arm 51 of the lever 49 is attached to a tension spring 53 which biases the elbow lever 49 into disengaged position as illustrated in FIG. 6. In this disengaged position, an upright roller 52 which is pivotably supported on the end of the short lever 51 is spaced apart from the rank-like intermediate part 47 of the pivot axle 37' so that the other spring 42 turns the actuation linkage including the elbow lever 35' and the ring arm 34 in the arresting position in which the transverse shaft 32 is displaced forwardly in its guiding slot 31 and the end pins 33 of the shaft engage selected holding recesses 27 of the arresting bracket 14'.

For changing the inclined position of the seat part 11 as illustrated in FIG. 5, the handle 40' is first turned against the force of the tension spring 53 until the upright roller 52 engages the bent intermediate part 47 of the pivot axle 37 and rotates the latter clockwise against the force of the tension spring 42. As a consequence, the elbow lever 35' is also turned clockwise upwardly and links 34 displace the shaft 32 in the guiding slots 31 rearwardly. In doing so, the end pins 33 of the transverse shaft 32 disengage the recesses 27 in the bracket 14' while pinions 37 remain in mesh with the toothed rack 29' on the respective rocking arms 44 which also are swung by the axle 32 rearwardly. By holding the handle 40' in its actuated or setting position, the front part of the seat 11 can now be lifted or lowered by pivoting about the pivot point 17. In the desired inclined position the handle 40' is released, tension springs 42 retract the long arms 41 of the elbow levers 35' counterclockwise and the links 34 displace again the shaft 32 in the guiding slot 31 forwardly and the end pins 33 of the shaft enter the holding recesses 27 corresponding to the desired vertical position of the front of the seat. Simultaneously, the rocking arms 44 together with the toothed racks 29' rotate forwardly while the pinions 36 remain in mesh with the racks. As in the preceding example, tension springs 42 urge the elbow lever 35', the links 34 and pins 33 of the shaft 32 into the tapering end portions of the recesses 27 so that a play-free arresting position of the seat is always maintained.

It will be understood that each of the elements discussed above, or two or more together, may also find a useful application in other types of constructions differing from the types described above.

While the invention has been illustrated and described as embodied in two specific examples of the inclination adjuster of this invention, it is not intended to be limited to the details shown, since various modifications and structural changes may be made without departing in any way from the spirit of the present invention. For example it is possible to exchange the position of the pivot point of the seat with the position of its inclination adjusting mechanism so that the rear part of the seat is lifted or lowered about a pivot point situated at the front part of the seat. Furthermore, it is also possible to replace this pivot point by the front inclination adjuster of the same design as employed at the other end of the vehicle seat so that the latter can be adjusted not only as to its inclined position but also as to its overall vertical position.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A seat position adjuster for seats, particularly for motor vechicle seats having a guiding track assembly mounted on the floor of the vehicle and a seat carrier pivotably connected at one end thereof to said guiding track assembly, comprising: guiding slots formed opposite each other in the lateral sides at the other end of said seat carrier; a transverse shaft supported for movement in said slots; holding brackets secured to said guiding track assembly opposite to said slots and each defining a vertical cutout having at one side thereof a plurality of superposed recesses adapted for receiving said shaft and at the other side thereof a passage permitting free movement of said shaft; gear segments connected to said brackets along said passage in said cutout; pinions supported for rotation on respective ends of said transverse shaft opposite said gear segments; and hand-operated and spring-biased linkage coupled to said shaft for normally urging the latter into a selected one of said superposed recesses and for displacing said shaft in said guiding slot for permitting free movement of said shaft in said vertical cutout when actuated, so as to simultaneously perform a locking function and guiding function, said linkage including coupling links supporting said transverse shaft with said pinions, and a hand lever for displacing at least one of said coupling links and thereby said transverse shaft with said pinions.

2. The adjuster as defined in claim 1 wherein said cutout and respectively said gear segments are curved about the pivot axle at said one end of said seat carrier.

3. The adjuster as defined in claim 1 wherein each of said holding recesses has a tapering configuration converging away from said passage in said cutout.

4. The adjuster as defined in claim 1 wherein each of said holding brackets is assembled of two angular pieces forming together a U-shaped cross section; said linkage being coupled to said transverse shaft between the arms of said bracket and said gear segments being secured, respectively, to the facing inside arms of the two brackets.

5. A seat position adjuster for seats, particularly for motor vehicle seats having a guiding track assembly mounted on the floor of the vehicle and a seat carrier pivotably connected at one end thereof to said guiding track assembly, comprising: guiding slots formed opposite each other in the lateral sides at the other end of said seat carrier; a transverse shaft supported for movement in said slots; holding brackets secured to said guiding track assembly opposite to said slots and each defining a vertical cutout having at one side thereof a plurality of superposed recesses adapted for receiving said shaft and at the other side thereof a passage permitting free movement of said shaft; gear segments connected to said brackets along said passage in cutout; pinions supported for rotation on respective ends of said transverse shaft opposite said gear segments; and hand-operated and spring-biased linkage coupled to said shaft for normally urging the latter into a selected one of said superposed recesses and for displacing said shaft in said guiding slot for permitting free movement of said shaft in said vertical cutout when actuated, said linkage including a pivot axle supported for rotation on said seat carrier, an elbow lever having its apex connected for joint rotation with said transverse pivot axle, a link coupled between one arm of said elbow lever and said shaft, and a tension spring arranged between the other arm of said elbow lever and said seat carrier to urge said linkage and said shaft in the arresting direction.

6. The adjuster is defined in claim 5 wherein a hand-operated lever is connected to said pivot axle for joint rotation with said elbow lever.

7. A seat position adjuster for seats, particularly for motor vehicle seats having a guiding track assembly mounted on the floor of the vehicles and a seat carrier pivotably connected at one end thereof to said guiding track assembly, comprising: juxtaposed bearing brackets connected to said guiding track assembly opposite said one end of said seat carrier and each including a collar bushing pivotably supporting said one end of said seat carrier; guiding slots formed opposite each other in the lateral sides at the other end of said seat carrier; a transverse shaft supported for movement in said slots; holding brackets secured to said guiding track assembly opposite to said slots and each defining a vertical cutout having at one side thereof a plurality of superposed recesses adapted for receiving said shaft and at the other side thereof a passage permitting free movement of said shaft; gear segments connected to said brackets along said passage in said cutout; pinions supported for rotation on respective ends of said transverse shaft opposite said gear segments; and hand-operated and spring-biased linkage coupled to said shaft for normally urging the latter into a selected one of said superposed recesses and for displacing said shaft in said guiding slot for permitting free movement of said shaft in said vertical cutout when actuated.

8. A seat position adjuster for seats, particularly for motor vehicle seats having a guiding track assembly mounted on the floor of the vehicle and a seat carrier pivotably connected at one end thereof to said guiding track assembly, comprising: guiding slots formed opposite each other in the lateral sides at the other end of said seat carrier; a transverse shaft supported for movement in said slots; holding brackets secured to said guiding track assembly opposite to said slots and each defining a vertical cutout having at one side thereof a plurality of superposed recesses adapted for receiving said shaft and at the other side thereof a passage permitting free movement of said shaft; a rocking arm supported by each of said holding brackets and hinged below said cutout, said rocking arm defining a vertical slot extending in the range of said cutout; gear segments connected to said brackets along said passage in said cutout secured to said rocking arms along one side of said vertical slot; pinions supported for rotation on respective ends of said transverse shaft opposite said gear segments and being in permanent engagement with said gear segments; and hand-operated and spring-biased linkage coupled to said shaft for normally urging the latter into a selected one of said superposed recesses and for displacing said shaft in said guiding slot for permitting free movement of said shaft in said vertical cutout when actuated.

9. The adjuster as defined in claim 8 wherein each of said holding brackets has two parallel arms, said rocking arms being arranged opposite each other and hinged below the corresponding cutouts to the inner arms of said brackets.

10. The adjuster as defined in claim 9 wherein said transverse shaft projects through said arms of respective holding brackets and said linkage is coupled to the end portions of said transverse shaft between said bracket arms.

11. The adjuster as defined in claim 8 wherein each gear segment is in the form of a straight rack swingable together with said rocking arm.

12. The adjuster as defined in claim 8 wherein said linkage includes an elbow lever having its apex rigidly connected to a pivot axle extending across said seat carrier and being supported for rotation on the latter; a link hinged between said transverse shaft and one arm of said elbow lever; and biasing spring arranged between the other arm of said elbow lever and aid seat carrier; said pivot axle having a crank-shaped intermediate portion; and an actuation elbow lever pivotable about a fixed pivot axle mounted on said seat carrier; a cam element mounted on one arm of said actuation elbow lever for engaging said crank-like portion of said pivot axle to rotate the same when said actuation lever is operated; and a spring for biasing said actuation lever into an inoperative position in which said cam element is out of engagement from said pivot axle.

13. A seat position adjuster for seats, particularly for motor vehicle seats having a guiding track assembly mounted on the floor of the vehicle and a seat carrier pivotably connected at one end thereof to said guiding track assembly, comprising: guiding slots formed opposite each other in the lateral sides at the other end of said seat carrier; a transverse shaft supported for movement in said slots; holding brackets secured to said guiding track assembly opposite to said slots and each defining a vertical cutout having at one side thereof a plurality of superposed recesses adapted for receiving said shaft and at the other side thereof a passage permitting free movement of said shaft; gear segments connected to said brackets along said passage in said cutout, said cutout and respectively said gear segments being curved about a pivot axle at said one end of said seat carrier, said gear segments and said other side of said cutout being located closer to said pivot axle than said holding recesses; pinions supported for rotation on respective ends of said transverse shaft opposite said gear segments; and hand-operated and spring-biased linkage coupled to said shaft for normally urging the latter into a selected one of said superposed recesses and for displacing said shaft in said guiding slot for permitting free movement of said shaft in said vertical cutout when actuated.

* * * * *